Sept. 29, 1931. L. S. ADAMS 1,825,329
AIRPLANE ARTICLE PICK-UP SHOCK ABSORBING MEANS
Filed Oct. 22, 1929

Inventor
Lytle S. Adams.
By Emery, Booth, Varney & Holcomb
his Attorneys

Patented Sept. 29, 1931

1,825,329

UNITED STATES PATENT OFFICE

LYTLE S. ADAMS, OF NEW YORK, N. Y.

AIRPLANE ARTICLE PICK UP SHOCK ABSORBING MEANS

Application filed October 22, 1929. Serial No. 401,535.

The invention relates to improvements in shock absorbing means for use on airplanes to prevent the sudden pull on the pick-up cable or grappling line when dropping or engaging a load from breaking the cable or damaging the airplane apparatus.

In my prior applications, Ser. No. 279,320, filed May 21, 1928, and Ser. No. 305,970, filed Sept. 14, 1928, I have shown devices which make it possible for a moving airplane to pick up a package or load from the ground by means of a trailing grappling line or cable suspended from a reel on the airplane.

This improvement comprises means for cushioning or frictionally absorbing the shock which almost necessarily occurs when the cable picks up the load before it is transmitted to the airplane fuselage or wing structure.

The invention aims to provide instantaneously responsive cushioning means, to prevent recoil and whipping of the cable and load, and to control the length of cable paid out to insure accuracy in determining the height of the grapple above the point of contact with the ground apparatus.

Further aims and advantages appear in connection with the following description of the illustrative embodiment of the invention shown in the accompanying drawings, wherein Fig. 1 is a side elevation of an airplane in flight, showing the trailing grappling line or cable extended ready to discharge and pick up a load, the bottom hatchway and cable reel being indicated in dotted lines;

Figure 1:
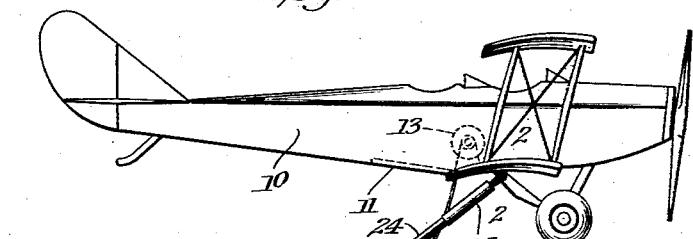

Referring to the drawings, the airplane 10 is fitted with an opening or hatchway 11 in the floor of the cock pit or cabin, closed by upwardly opening doors 12, adjacent to which is mounted a reel 13 for paying out and winding up the grappling line or cable 14 which is fitted with the anchor ball 15 or other grappling device and is suspended below the airplane through suitably located openings 12 in the doors.

Figure 2:
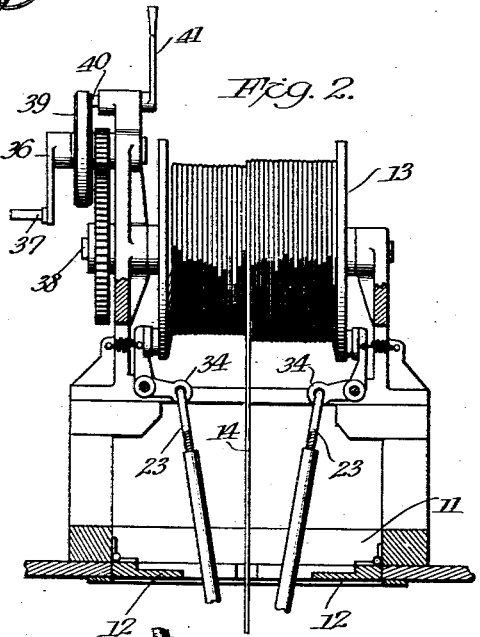
Fig. 2 is a detail side view to a larger scale of the cable reel and brake, the hatchway and hatch being shown in section on the line 2—2 in Fig. 1, looking to the rear.

In the form of grapple illustrated, the anchor ball is connected to a socket or cup member 16 by means of a frangible connection 17 (see Fig. 2). The load 18 may be detachably secured to the socket member of the grappling device by means of an elastic cord 19 or other resilient means to reduce the shock upon the cable when it strikes the ground or ground apparatus at the moment of being detached. This elastic cord also absorbs some of the shock due to picking up a stationary load by the moving grappling device, and the ball is fitted with a rubber washer 20 to assist in cushioning the shock of picking up the load.

In the operation of an airplane provided with my improved pick-up device, the pilot flies at a fixed altitude above the ground station, which may be seventy-five feet or whatever distance above the field the usual beacons are located, and lets out sufficient cable, say one hundred and fifty feet, to suspend the load at the right height above the ground for engagement with the ground trap at the speed at which he is flying.

To assist the pilot in controlling the amount of cable let out, a ball or other fixed object 21 is clamped to the cable, say one hundred and fifty feet from the grapple end, and adapted to engage a yoke 22, held by a double shock cord 23, secured at its upper ends to the landing gear struts 24 or other convenient part of the body structure. This yoke has an opening which embraces the cable, but the opening is too small to pass the ball 21, so when the latter strikes the yoke as the cable is paid out through it the cable is arrested, the weight of the load 18 being taken by the shock cord 23. Upon dropping the load, the recoil due to the resiliency of the stretched cord 23 is absorbed by the telescoping encasing members 24, 25, which partly cover the shock cords and protect them from injury.

Figure 5:
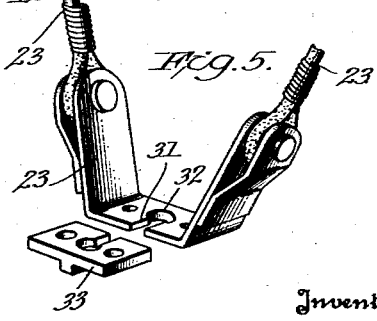
Fig. 5 is a detail perspective view of a shock cord yoke connection.

Referring to Figs. 5 and 6, the inner telescoping members 24 are secured at the lower end of the shock cords, and the outer telescoping members 25, are secured at the upper end to the shock cords, the intermediate portions being free to telescope more or less to accommodate the varying length of the cords. Preferably, the telescoping members are provided with friction clamps 26, or suitable devices arranged to arrest collapsing movement but not to hinder opening movement of the sections. For example, the space within the telescoping members may be utilized to trap air admitted through the check valves 28, thereby opposing contraction of the shock cord. An adjustable valve 29 may be provided for controlling the amount of air permitted to escape as the shock cords contract upon dropping the load, thereby regulating the speed of recoil and preventing the grappling device 15 from whipping up into the plane. The yoke 22 may advantageously comprise a double armed body having a slot 31 leading from one edge into the center hole 32 for the cable, this slot being closed by a cover plate 33 to prevent the cable from whipping out.

The reel preferably has winding means, such as the gearing 35, 36, and crank 37, for rotating the shaft 38 upon which it is keyed or otherwise mounted, and brake means under the control of the pilot including a friction drum 39 on the gear 36, provided with a band 40 and lever 41 for applying it at will. The upper ends of the shock cords 23 may be attached to brake levers 42 pivoted to the frame at the ends of the reel to slow it down automatically when the load comes on the shock cords by pressing the brake blocks 43 against the ends of the reel. Springs 44 normally hold these blocks from engaging the reel (see Fig. 2).

Figure 3:
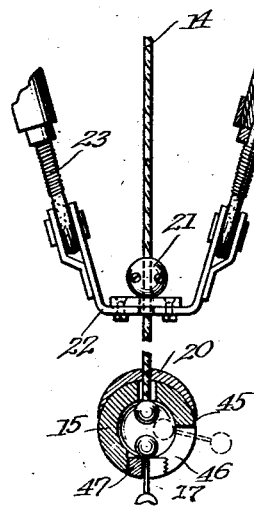
Fig. 3 is a detail side view of portions of the trailing grappling line or cable, showing a form of grapple and a suitable connection for engaging a shock cord, one shock cord and its telescoping casing being shown in section.
Figure 4:
Fig. 4 is a cross-sectional view.

The anchor ball in the form illustrated is hollow, and the frangible connectors 17 may be slipped into the hollow ball through an orifice 45 at one side, and connected with the axial passage in the nut 47 by a slot 46, as shown in Fig. 3. By turning the slotted nut 47, this slot 46 may be closed to secure the frangible connector in place.

In operating the device, the operator opens the trap doors 12 and drops the anchor ball and attached cup and package, controlling its speed of descent by the hand brake. The automatic brake 43 comes into action to slow down the reel when the cable is paid out to the desired distance so that the ball 21 engages the yoke 22, which transfers the weight of the trailing load to the shock cords 23 as shown in Fig. 1.

The trailing load moves horizontally through the air with the plane, which is flown at the proper altitude by reference to the field beacons, until it enters the trap and is brought to rest, thereby parting the frangible connection 17, and the anchor ball picks up the waiting carrier, all shocks during this exchange being absorbed by the shock cords 19, rubber washer 20, and shock cords 23. Should the load become detached after stretching out the shock cords 23, the telescoping members 24, 25, will check the recoil of the cable and ball and prevent possible damage to the airplane.

The advantages of the improvement are obvious, and greatly prolong the serviceable life of the apparatus.

The invention is not restricted to the apparatus shown, that being illustrative for purposes of description, what is claimed being as follows:

1. The combination with an airplane, of a grappling line, and shock absorbing means comprising an elastic cord connecting the grappling line with the airplane.

2. The combination with an airplane, of a winding drum mounted thereon, a grappling line wound upon said drum and elastic stop means actuated by the paying out of part of said line for retarding the further unwinding of said drum.

3. In grappling line apparatus for airplane use, a winding reel mounted on the plane, a cable wound thereon, brake means for controlling the unwinding thereof, and means actuated by the unwinding of a predetermined length of said cable for applying said brake means.

4. In grappling line apparatus for airplane use, a winding reel mounted on the plane, a cable wound thereon, brake means for controlling the unwinding thereof, and means actuated by the unwinding of a predetermined length of said cable for applying said brake means, said brake applying means including a resilient member for supporting said cable independently of said drum.

5. In combination with an airplane and a winding reel mounted thereon, a grappling line wound on said reel and adapted to be let out to trail below said airplane, extensible means attached to said airplane at one end and at the other end adapted for engagement by said line to support the latter independently of said reel.

6. In combination with an airplane and a winding reel mounted thereon, a grappling line wound on said reel and adapted to be let out to trail below said airplane, extensible means attached to said airplane at one end and at the other end adapted for engagement by said line to support the latter independently of said reel, said engagement being effected by an enlargement secured to and adjustable lengthwise on said line.

7. In combination with an airplane and a winding reel mounted thereon, a grappling line wound on said reel and adapted to be let out to trail below said airplane, shock cords attached to said airplane at one end and at the other end secured to a yoke adapted for engagement by said line to support the latter independently of said reel.

8. In combination with an airplane and a winding reel mounted thereon, a grappling line wound on said reel and adapted to be let out to trail below said airplane, extensible means attached to said airplane at one end and at the other end adapted for engagement by said line to support the latter independently of said reel, and anti-recoil devices associated with said extensible means for preventing too rapid return of said line when the load is removed.

9. In an airplane pick up apparatus of the character described, resilient means for cushioning the shock which occurs when the trailing cable picks up the load, said shock cushioning means being encased in a tube.

10. In an airplane pick up apparatus of the character described, a grapple suspended at the end of a trailing cable, an elastic cord for connecting said cable to the air plane and resilient means associated with said grapple for cushioning the shock which occurs when the grapple picks up the load.

11. In an airplane pick up apparatus of the character described, resilient means for cushioning the shock which occurs when the trailing cable picks up the load, and means for preventing excessive recoil of said cable when the load is dropped.

12. In an airplane pick up apparatus of the character described, resilient means for cushioning the shock which occurs when the trailing cable picks up the load, and means for preventing excessive recoil of said cable when the load is dropped, said resilient means being encased in telescoping tubes to protect it from damage and prevent over rapid recoil.

13. An airplane pick up apparatus comprising a winding reel mounted in the fuselage, a trailing cable suspended therefrom through a hatchway in the bottom of the fuselage, doors for said hatchway, and a load attaching device secured to the free end of said cable, in combination with resilient means for supporting said trailing cable and grapple at a predetermined distance below said hatchway, said resilient means also having an anti-recoil device for preventing said cable and grapple from being thrown back against the airplane upon sudden diminution of the load.

14. Means for cushioning the shock upon the trailing grappling line of an airplane pick up apparatus comprising a supporting yoke resiliently suspended from the airplane and slidably engaging said line, and a limit stop secured to said line in position to engage said yoke at the downward limit of its movement.

15. Means for cushioning the shock upon the trailing grappling line of an airplane pick up apparatus comprising a supporting yoke detachably engaging said line, resilient supporting means for said yoke attached to the airplane, and enclosing telescoping tubes for said resilient means freely extensible but resisting return to nested position.

16. Means for cushioning the shock upon the trailing grappling line of an airplane pick up apparatus comprising a supporting yoke resiliently suspended from the airplane and detachably engaging said line, and means adjustably secured upon said line for engaging said yoke, whereby said line may be freely and resiliently suspended from said airplane.

17. In an airplane pick up apparatus of the character described, resilient means for cushioning the shock which occurs when the trailing cable picks up the load, and means for preventing excessive recoil of said cable when the load is dropped, said resilient means being encased to protect it from damage and prevent over rapid recoil.

18. An airplane pick up apparatus comprising a winding reel mounted in a fuselage, a grappling device suspended therefrom by a flexible member wound upon said reel and means for actuating said reel, in combination with an elastic cord for supporting said grapple at a predetermined distance below said fuselage.

19. An airplane pick up device comprising a winding reel mounted in the airplane and a trailing cable suspended therefrom provided with a grapple at its lower end, means for guiding said cable depending from the airplane, and an elastic cord adapted to engage said cable for relieving the shock of picking up the load.

20. An airplane pick up device comprising a trailing cable carried by said airplane, guide means depending from the airplane and having a sliding engagement with said cable, a grapple device on the end of said cable, and an elastic cord for relieving the shock of picking up the load.

In testimony whereof, I have signed my name to this specification.

LYTLE S. ADAMS.